US008847926B2

(12) United States Patent  (10) Patent No.: US 8,847,926 B2
Yeh  (45) Date of Patent: Sep. 30, 2014

(54) TOUCH PANEL WITH IMPROVED TOUCH POSITION DETERMINING CAPABILITY

(75) Inventor: Shang-Tai Yeh, Taipei (TW)

(73) Assignee: Egalax_Empia Technology Inc., Taipei (TW)

( * ) Notice: Subject to any disclaimer, the term of this patent is extended or adjusted under 35 U.S.C. 154(b) by 447 days.

(21) Appl. No.: 12/965,520

(22) Filed: Dec. 10, 2010

(65) Prior Publication Data

US 2011/0096038 A1   Apr. 28, 2011

Related U.S. Application Data

(63) Continuation-in-part of application No. 11/819,359, filed on Jun. 27, 2007, now abandoned.

(30) Foreign Application Priority Data

Jun. 27, 2006 (TW) .............................. 95123165 A

(51) Int. Cl.
G06F 3/043 (2006.01)

(52) U.S. Cl.
CPC .................................. G06F 3/0436 (2013.01)

USPC ......................................... 345/177; 178/18.04

(58) Field of Classification Search
USPC ...................... 345/173, 177; 178/18.04, 19.02
See application file for complete search history.

(56) References Cited

U.S. PATENT DOCUMENTS

| 5,854,450 | A  | * | 12/1998 | Kent .......................... 178/18.04 |
| 6,313,829 | B1 | * | 11/2001 | Tolt et al. ........................ 345/177 |
| 6,441,809 | B2 | * | 8/2002  | Kent et al. ....................... 345/177 |
| 6,633,280 | B1 |   | 10/2003 | Matsumoto et al. |
| 2004/0248548 | A1 | | 12/2004 | Niwa et al. |
| 2005/0243071 | A1 | | 11/2005 | Kent et al. |
| 2007/0279398 | A1 | | 12/2007 | Tsumura et al. |

FOREIGN PATENT DOCUMENTS

GB   2179152   2/1987

* cited by examiner

*Primary Examiner* — Jimmy H Nguyen
(74) *Attorney, Agent, or Firm* — WPAT, PC; Justin King

(57) ABSTRACT

A surface acoustic wave (SAW) touch panel with improved touching precision is provided. By forming a matte surface that diffuses a back wave generated by the edge of the SAW touch panel due to discontinuity, the touching precision of the SAW touch panel is improved.

20 Claims, 6 Drawing Sheets

TOUCH PANEL WITH IMPROVED TOUCH POSITION DETERMINING CAPABILITY

CROSS REFERENCE TO RELATED APPLICATIONS

This application claims the benefit of U.S. application Ser. No. 11/819,359, filed on Jun. 27, 2007, which is herein incorporated by reference for all intents and purposes.

This application claims the right of priority based on Taiwan Patent Application No. 095123165 entitled "Surface Acoustic Wave Touch Panel with Improved Touching Precision", filed on Jun. 27, 2006, which is incorporated herein by reference for all intents and purposes and assigned to the assignee herein.

BACKGROUND OF THE INVENTION

1. Field of the Invention

The present invention generally relates to a touch panel, and more particularly, to a surface acoustic wave (SAW) touch panel capable of reducing a back wave generated from a surface acoustic signal wave therein.

2. Description of the Prior Art

Electronic devices are generally not inputted by voice or handwriting, which are intuitive to humans, but a keyboard or a mouse. Such inputting through the keyboard or mouse is not made in a direct sense and would possibly form a barrier for those who are not familiar with operations on the electronic devices. In this regard, more intuitively operated inputting devices and methods have been expected to be used on the new electronic devices. Touch panel is one of these promising inputting devices.

Touch panel has the simplest user-machine interface among those of the currently available intuitively inputting devices. In operation, an object, normally a stylus or a finger of a user, touches the panel and a position of the touch is determined. Then, when continuous touch positions (in some cases) are obtained, a corresponding input is thus formed. With the provision of the touch panel, it is relatively easier for the user to input to an electronic device by the intuitive sense based inputting method other than the keyboard and mouse lacking of the intuitive basis.

In general, a touch panel is a glass substrate constructed by a conductive glass and a conductive film, through which images are displayed on a touch screen thereof with the aid of associated control ICs on a printed circuit board (PCB) provided therebelow. A touch panel has the humanized input interface characteristic and thus requiring the least teaching and learning for man. That is, the user can directly input instructions by a finger or touch pen, etc., through the touch panel according to the function indication shown on the screen. The touch panel may be broadly applied onto, for example, eBook, global positioning system (GPS), personal digital assistant (PDA), WebPhone, notebook, Web Pad, handheld PC, etc.

In general, the touch panel are classified into at least four types: resistive, capacitive, IR, and surface acoustic wave (SAW) touch panel. The SAW type touch panel employs acoustic waves propagating in a substrate surface. When an object touches the surface, the propagation of the specific acoustic waves associated therewith will be blocked. By detecting this sudden change, the location on the touch panel touched by the object can be determined. Referring to FIG. 1A and FIG. 1B, which respectively show a vertical view and a 3D diagram of a conventional SAW type touch panel 100. As shown, the touch panel 100 includes a substrate 104 having a first side 106, a second side 108, a third side 110 and a fourth side 112 together defining a surface 104; and an X-axis transmitting transducer 114, an X-axis receiving transducer 116; a Y-axis transmitting transducer 124 and a Y-axis receiving transducer 126. Each of the transducers 114, 116, 124, 126 has a plurality of reflectors formed therein, which are not uniformly arranged in the respective reflecting stripes 114, 116, 124, 126, exactly, from thinness to thickness when viewed in the propagation direction of the unreflected surface waves, which will be appreciated after the following context is read. The described receiving transducers 116, 126 are devices which can transform a mechanical energy to an electrical energy by a piezoelectric material, and vice versa. As generally known to those skilled in the art, each of the transducers 114, 116, 124, 126 may have a wedge or comb form.

As shown in FIG. 2, it is a case where the wedge formed transducer 230 is used, where a shear wave is transformed into a surface wave. In FIG. 2, the reference numeral 232 represents the piezoelectric material, and the arrow indicates the propagation direction of the surface wave. As shown in FIG. 3, it is another case where the comb formed transducer 330 is used, where a longitudinal wave is transformed to a surface wave, which is propagated in the direction indicated by the arrow, and the reference numeral 332 represents a piezoelectric material. Referring back to FIGS. 1A and 1B, the substrate 104 further includes reflecting stripes 190, 191, 192, and 193. The surface wave produced by the X-axis transducer 114 is transmitted along the −x direction and then the +y direction when being reflected by the reflecting strips 193, where some surface waves are caused to occur. Then, the reflected surface waves proceed along the +x direction when encountering the reflecting strips 191. Finally, the surface waves are received by the X-axis receiving transducer 116 and transformed into electrical energy thereby. Similarly, the surface wave produced by the Y-axis transducer 124 is transmitted along the −y direction and then the +x direction after being reflected by the reflecting stripes 192, where some surface waves are caused to present. Then, the reflected surface waves proceed along the +y direction when encounter the reflecting stripes 190. Finally, the surface waves are received by the Y-axis receiving transducer 126 and transformed into an electrical energy.

Take the X-axis as an example, referring to FIG. 4 and FIG. 5, FIG. 4 illustrates a voltage wave Vx of the electric energy generated from the X-axis receiving transducer 116 when no any object touches on the surface 104 of the touch panel, and FIG. 5 illustrates a voltage wave Vx of the electric energy generated from the X-axis receiving transducer 116 when an object touches on the surface 104 of the touch panel. As can be appreciated, the presence of the object leads to an absorption of a large portion of the surface wave energy existing thereunder, and a corresponding voltage drop is thus created on the voltage wave Vx. This voltage drop can be relied upon to deduce the Y-axis position of the object on the substrate 104 of the touch panel based on the fact that different surface waves associated with the X-axis transmitting and receiving transducers 114, 116 and different reflectors of the reflecting stripes 191, 193 have different times before being received at the receiving transducer 116. Likewise, a voltage wave Vy in relation to the X-axis position of the object touching on the substrate 104 of the touch panel 100 also exists although not shown in the figures. However, the surface wave does not ideally proceed in a straight direction but somewhat diverges, like that of an optical beam. At this time, when the surface wave is transmitted to an edge of the substrate, a back wave due to discontinuity at the edge is generally generated. The back wave interferes with the propagation of the component of the surface wave still under the corresponding reflecting stripe, and accordingly adversely affects the accuracy of position detection. Therefore, there is a need to provide a touch panel with an improved touch position determining capability.

From the above it is clear that prior art still has shortcomings. In order to solve these problems, efforts have long been made in vain, while ordinary products and methods offering no appropriate structures and methods. Thus, there is a need in the industry for a novel technique that solves these problems.

SUMMARY OF THE INVENTION

It is, therefore, an object of the present invention to provide a surface acoustic wave (SAW) type touch panel with an improved touch position determining capability.

In one embodiment, disclosed is a touch panel with an improved touch position determining capability is provided. The touch panel includes a substrate having a first side, a second side, a third side, and a fourth side, each having two ends and together defining a surface; an X-axis transmitting transducer located near one end of the first side on the surface; an X-axis receiving transducer located near the other end of the first side on the surface; a Y-axis transmitting transducer located near one end of the second side on the surface; and a Y-axis receiving transducer located near the other end of the second side on the surface. The substrate includes a matte surface between the surface and the third side for diffusing the surface acoustic wave transmitted by the X-axis transmitting transducer.

The substrate can also include the matte surface between the surface and the third side for diffusing the surface acoustic wave transmitted by the X-axis transmitting transducer. The matte surface can comprise an inclined surface or a rounded surface. Besides, the substrate can also include the matte surface between the surface and the first side for diffusing a surface acoustic wave transmitted by the X-axis transmitting transducer and the matte surface between the surface and the second side for diffusing a surface acoustic wave transmitted by the Y-axis transmitting transducer.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

The present invention discloses a touch panel with improved touch position determining capability. For better understanding, one may read the following description in conjunction with the accompanying drawings.

Figure 1A:
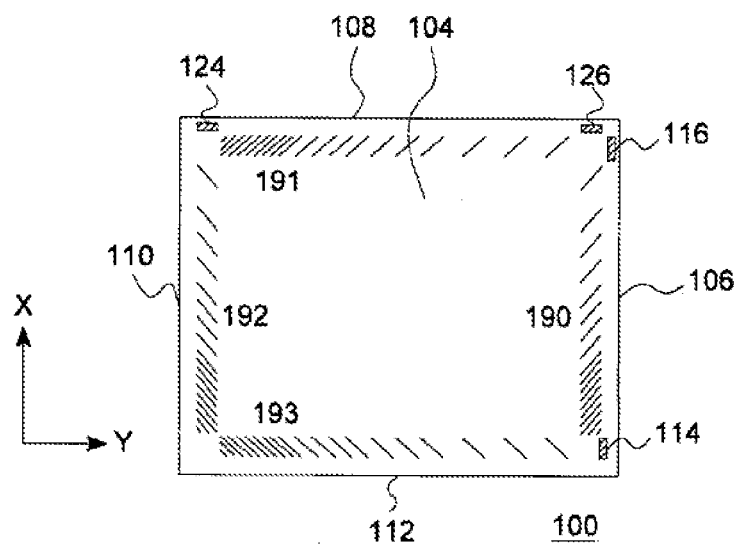
FIG. 1A illustrates a top view of a conventional surface acoustic wave (SAW) type touch panel.
Figure 1B:
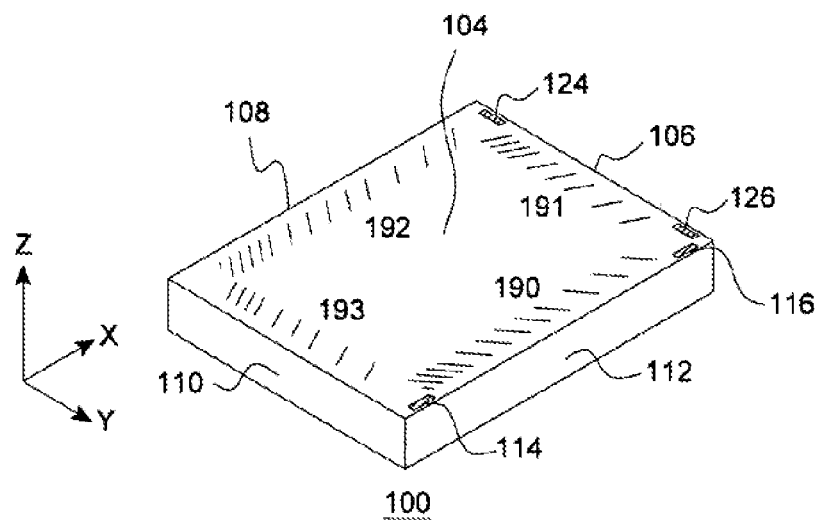
FIG. 1B illustrates a three-dimension view of the conventional SAW type touch panel.
Figure 2:
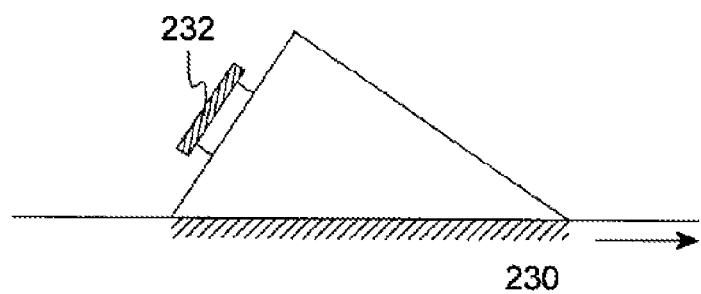
FIG. 2 illustrates a known wedge type transducer.
Figure 3:
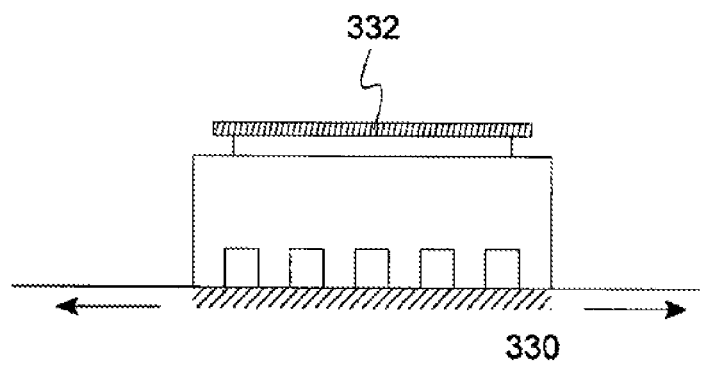
FIG. 3 illustrates a known comb type transducer.
Figure 4:
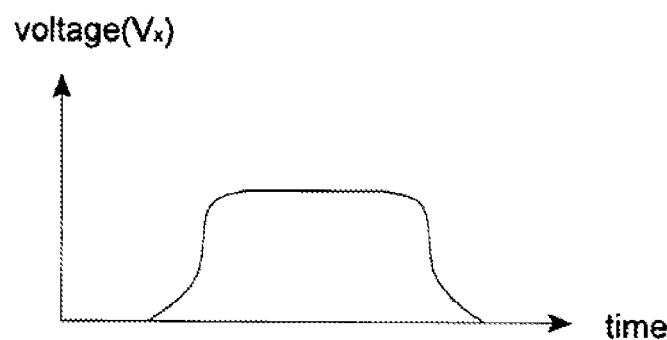
FIG. 4 illustrates a voltage wave generated from a receiving transducer without any object existing on the touch panel.
Figure 5:
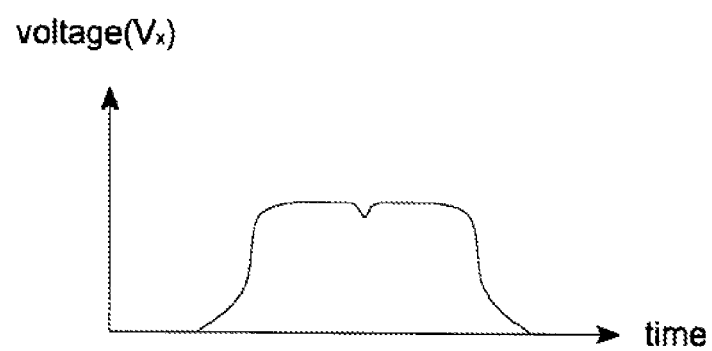
FIG. 5 illustrates a voltage wave generated from a receiving transducer when an object exists on the touch panel.
Figure 6:
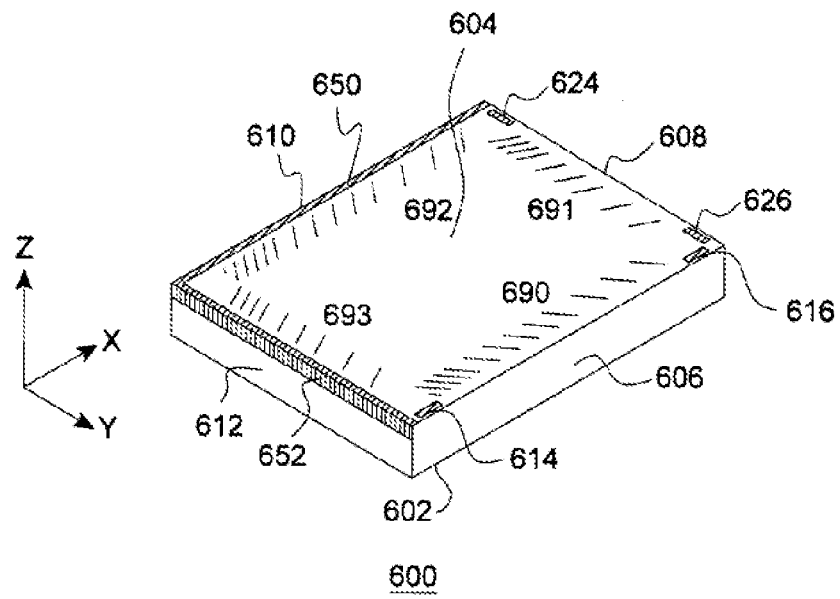
FIG. 6 illustrates a three-dimensional view of a SAW type touch panel with improved touch position determining capability in accordance with an embodiment of the present invention.

In one embodiment, FIG. 6 illustrates a three-dimensional diagram for a surface acoustic wave (SAW) type touch panel 600 with improved touch position determining capability according to the present invention. The touch panel 600 includes a substrate 602 having a first side 606, a second side 608, a third side 610, and a fourth side 612 together defining a surface 604, and an X-axis transmitting transducer 614, an X-axis receiving transducer 616, a Y-axis transmitting transducer 624 and a Y-axis receiving transducer 626. Four reflecting stripes 690, 691, 692, 693 are provided on the surface 604 near the first, second, third and fourth sides 606, 608, 610, 612, respectively. In each of the reflecting stripes 690, 691, 692, 693, a plurality of reflectors are arranged from thinness to thickness when viewed from the direction a surface wave is emitted from the corresponding transmitting transducers 614, 624. In this manner, the surface wave provided at an upstream part and a downstream part of any of the reflecting stripes 690, 691, 692, 693 can be uniform. That is, the down stream part of any of reflecting stripes 690, 691, 692, 693 can be compensated in an amount of the surface wave.

In the touch panel 600, a third matte surface 650 is provided to the third side 610 for reducing a back wave generated from the surface wave transmitted by the X-axis transmitting transducer 614 is provided. A fourth matte surface 652 is provided to the fourth side 612 to reduce a back wave generated from the surface wave transmitted by the Y-axis transmitting transducer 624. In an embodiment, the third and fourth matte surfaces 650, 652 are each presented rough and uneven in surface, so that a rough feel may be obtained. It is to be noted that the level of the roughness are constructed dependent upon a wavelength of the surface wave. In fact, any rough surface which can diffuse a surface wave can be served as the above mentioned third and fourth matte surfaces 650, 652, even a combination of different matte surfaces.

Figure 7:
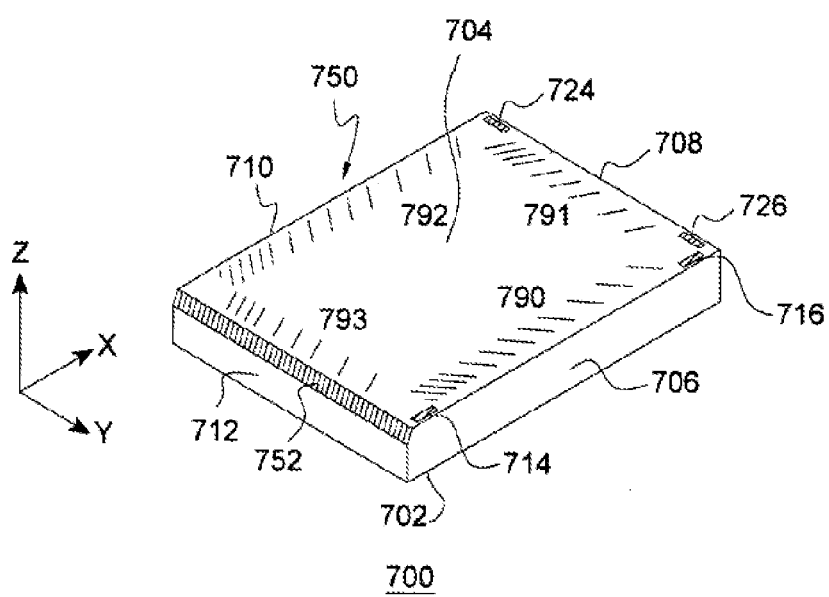
FIG. 7 illustrates a three-dimensional view of the SAW type touch panel in accordance with another embodiment of the present invention.

In another embodiment, as shown in FIG. 7, the touch panel 700 includes a substrate 702 having a first side 706, a second side 708, a third side 710 and a fourth side 712, together defining a surface 704, and an X-axis transmitting transducer 714, an X-axis receiving transducer 716, a Y-axis transmitting transducer 724 and a Y-axis receiving transducer 726. In addition, four reflecting stripes 790, 791, 792, 793 are provided on the surface 704 near the first, second, third and fourth sides 706, 708, 710, 712, respectively. And the details for the touch panel 700 are identical to those of the touch panel 600, except that the third matte surface 750 and fourth matte surfaces 752. In this embodiment, the third matte surface 750 and fourth matte surfaces 752 are each designed as an inclined surface. (The inclination of the surface 750 is not shown in FIG. 7)

Figure 8:
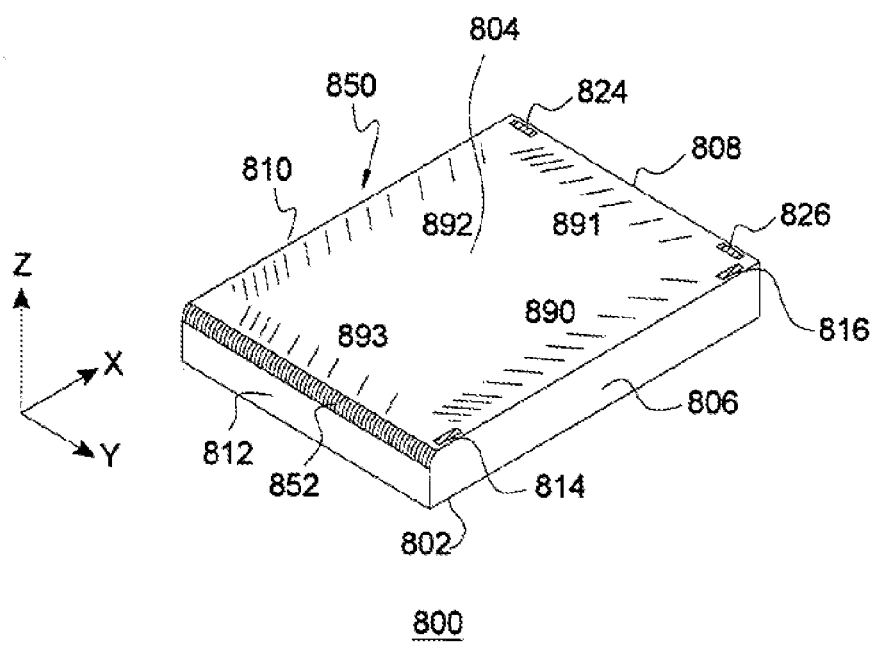
FIG. 8 illustrates a three-dimensional view of the SAW type touch panel in accordance with yet another embodiment of the present invention.

In yet another embodiment, as shown in FIG. 8, the touch panel 800 includes a substrate 802 having a first side 806, a second side 808, a third side 810 and a fourth side 812, together defining a surface 804, and an X-axis transmitting transducer 814, an X-axis receiving transducer 816, a Y-axis transmitting transducer 824 and a Y-axis receiving transducer 826. In addition, four reflecting stripes 890, 891, 892, 893 are provided on the surface 804 near the first, second, third and fourth sides 806, 808, 810, 812, respectively. And the details for the touch panel 800 are identical to those of the touch panel 600, except that the third matte surface (not shown) and fourth matte surfaces 852. In this embodiment, the third matte surface and fourth matte surfaces 852 are each designed as a rounded surface. (The rounded feature of the surface 850 is not shown in FIG. 8)

Figure 9:
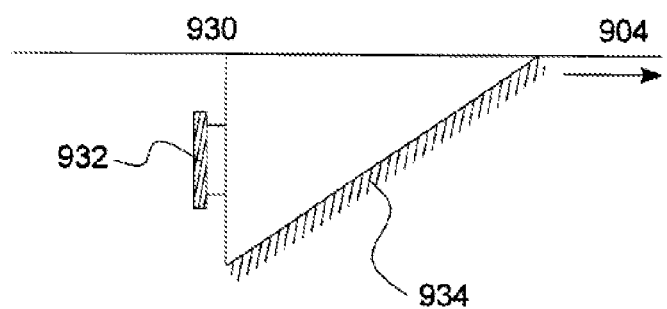
FIG. 9 shows a wedge type transducer incorporated with an inclined surface in accordance with still another embodiment of the present invention.

In still another embodiment, in the case of wedge formed transducers for the touch panel schematically depicted in FIG. 6, FIG. 7 and FIG. 8, the first sides 606, 706, 806 and second sides 608, 708, 808 may each be provided with an inclined surface. Referring to FIG. 9, a piezoelectric material 932 is provided. A transducer 930 is provided on the inclined surface 934, through which a surface wave generated from the transducer 930 is transmitted to the surface 904. Certainly, each of the first sides 606, 706, 806 and second sides 608, 708, 808 may be provided with the above matte surface or a material capable of absorbing an acoustic wave to avoid interference of a back wave.

The above mentioned matte surface can be the glass surface grounded by abrasion or etching to produce a flat but rough (matte) finish. In one of examples of the present invention, referring to FIG. 6, the matte surface covers a portion of the surface and a portion of the sides. In another one of examples of the present invention, referring to FIG. 7 and FIG. 8, the matte surface can be provided between the sides and the surface defined by the sides. More particularly, the matte surface can be rounded and without an angle for reflection between the surface and the sides, whereby the surface wave can go through the rounded matte surface to be diffused and none or less of the surface wave is reflected.

Figure 10:
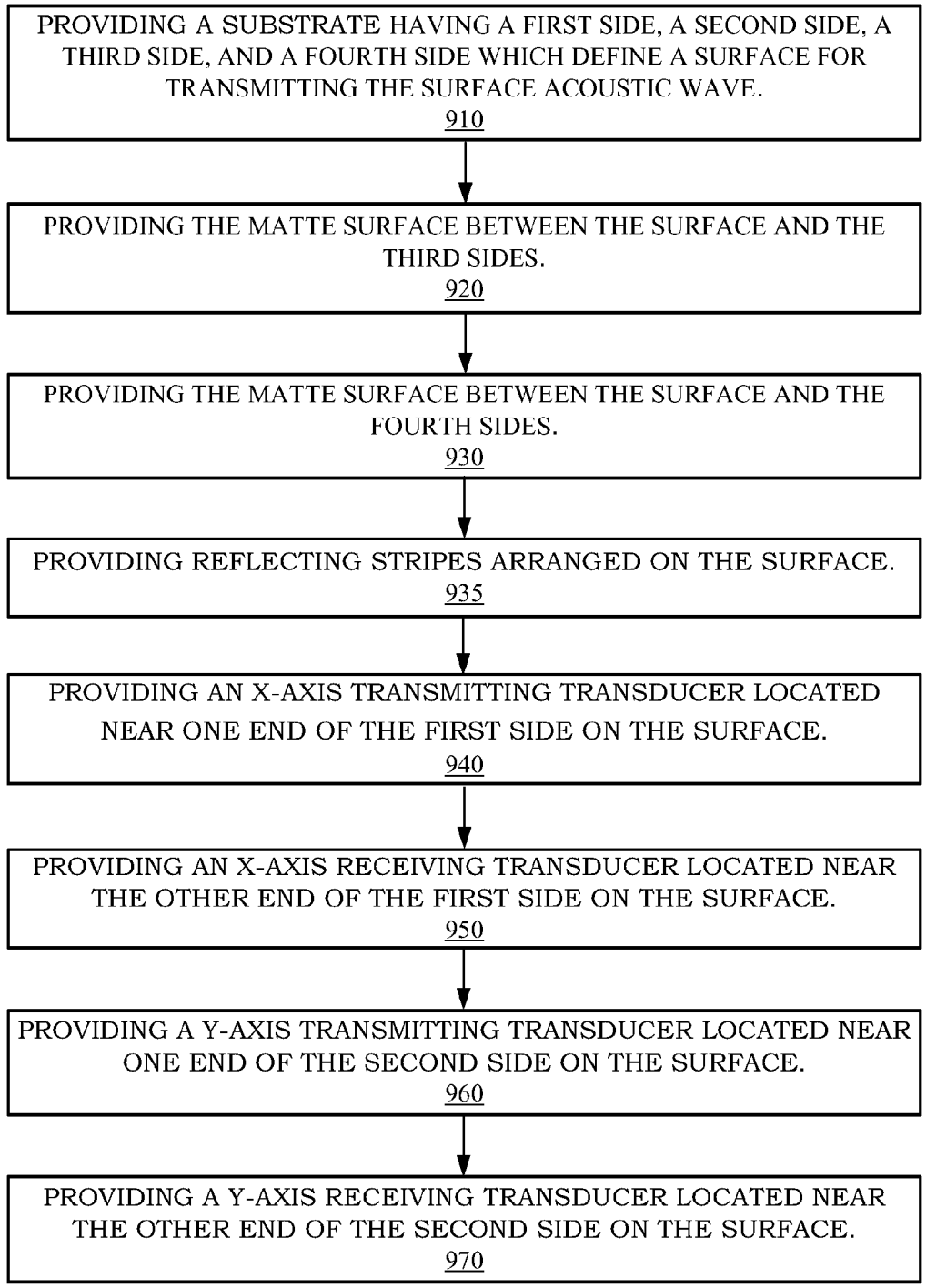
FIG. 10 illustrates a method for manufacturing a touch panel.

In further embodiment, a method for manufacturing a touch panel is provided, referring to FIG. 10. In step 910, a substrate having a first side, a second side, a third side, and a fourth side, wherein each of the sides has two ends and the sides define a surface for transmitting the surface acoustic wave. In addition, in step 920 and 930, the matte surface between the surface and the third sides and the matte surface between the surface and the fourth sides are provided. Furthermore, in step 940, 950, 960 and 970, an X-axis transmitting transducer located near one end of the first side, an X-axis receiving transducer located near the other end of the first side on the surface, a Y-axis transmitting transducer located near one end of the second side, and a Y-axis receiving transducer located near the other end of the second side are provide.

By means of the detailed descriptions of what is presently considered to be the most practical and preferred embodiments of the subject invention, it is expected that the features and the gist thereof be clearly described. Nevertheless, these embodiments are not intended to be construed in a limiting sense. Instead, it will be well understood that any analogous variations and equivalent arrangements will fall within the spirit and scope of the invention.

What is claimed is:

1. A touch panel, comprising:
   a substrate having a first side, a second side, a third side, and a fourth side, each having two ends and together defining a surface;
   an X-axis transmitting transducer located near one end of the first side on the surface;
   an X-axis receiving transducer located near the other end of the first side on the surface;
   a Y-axis transmitting transducer located near one end of the second side on the surface; and
   a Y-axis receiving transducer located near the other end of the second side on the surface, wherein the substrate comprises a matte surface continuously associated with the third side between the surface and the third side for diffusing a surface acoustic wave transmitted by the X-axis transmitting transducer, wherein the matte surface continuously associated with the third side is rough and uneven by abrasion or etching, and wherein the material of the matte surface is as the same as the material of the substrate.

2. The touch panel as claimed in claim 1, wherein the matte surface associated with the third side comprises an inclined surface.

3. The touch panel as claimed in claim 1, wherein the matte surface associated with the third side comprises a rounded surface.

4. The touch panel as claimed in claim 1, wherein the substrate further comprises a matte surface associated with the fourth side between the surface and the fourth side for diffusing the surface acoustic wave transmitted by the Y-axis transmitting transducer.

5. The touch panel as claimed in claim 1, wherein the substrate further comprises a matte surface associated with the first side between the surface and the first side for diffusing a surface acoustic wave transmitted by the X-axis transmitting transducer.

6. The touch panel as claimed in claim 1, wherein the substrate further comprises a matte surface associated with the second side between the surface and the second side for diffusing a surface acoustic wave transmitted by the Y-axis transmitting transducer.

7. The touch panel as claimed in claim 1, wherein the substrate comprises reflecting stripes arranged on the surface.

8. A method for manufacturing a touch panel, comprising:
   providing a substrate having a first side, a second side, a third side, and a fourth side, each having two ends and together defining a surface;
   providing a matte surface continuously associated with the third side between the surface and the third side, wherein the matte surface continuously associated with the third side is rough and uneven by abrasion or etching, and wherein the material of the matte surface continuously associated with the third side is as the same as the material of the substrate;
   providing a matte surface continuously associated with the fourth side between the surface and the fourth side, wherein the matte surface continuously associated with the fourth side is rough and uneven in surface and wherein the material of the matte surface continuously associated with the third side is as the same as the material of the substrate;
   providing reflecting stripes arranged on the surface;
   providing an X-axis transmitting transducer located near one end of the first side on the surface;
   providing an X-axis receiving transducer located near the other end of the first side on the surface;
   providing a Y-axis transmitting transducer located near one end of the second side on the surface; and
   providing a Y-axis receiving transducer located near the other end of the second side on the surface.

9. The method as claimed in claim 8, wherein the matte surface associated with the third side comprises an inclined surface.

10. The touch panel as claimed in claim 8, wherein the matte surface associated with the third side comprises a rounded surface.

11. The touch panel as claimed in claim 8, wherein the substrate further comprises a matte surface associated with the first side between the surface and the first side for diffusing a surface acoustic wave transmitted by the X-axis transmitting transducer.

12. The touch panel as claimed in claim 8, wherein the substrate further comprises a matte surface associated with the second side between the surface and the second side for diffusing a surface acoustic wave transmitted by the Y-axis transmitting transducer.

13. The touch panel as claimed in claim 8, wherein the substrate comprises reflecting stripes arranged on the surface.

14. A touch panel, comprising:
    a substrate having a first side, a second side, a third side, and a fourth side, each having two ends and together defining a surface;
    an X-axis transmitting transducer located near one end of the first side on the surface;
    an X-axis receiving transducer located near the other end of the first side on the surface;
    a Y-axis transmitting transducer located near one end of the second side on the surface; and
    a Y-axis receiving transducer located near the other end of the second side on the surface, wherein the substrate comprises a matte surface continuously associated with the third side covering a portion of the surface and a portion of the third side for diffusing a surface acoustic wave transmitted by the X-axis transmitting transducer, wherein the matte surface continuously associated with the third side is rough and uneven in surface, and wherein the material of the matte surface is as the same as the material of the substrate.

15. The touch panel as claimed in claim 14, wherein the matte surface associated with the third side comprises an inclined surface.

16. The touch panel as claimed in claim 14, wherein the matte surface associated with the third side comprises a rounded surface.

17. The touch panel as claimed in claim 14, wherein the substrate further comprises a matte surface associated with the fourth side covering a portion of the surface and a portion of the fourth side for diffusing the surface acoustic wave transmitted by the Y-axis transmitting transducer.

18. The touch panel as claimed in claim 14, wherein the substrate further comprises a matte surface associated with the first side covering a portion of the surface and a portion of the first side for diffusing a surface acoustic wave transmitted by the X-axis transmitting transducer.

19. The touch panel as claimed in claim 14, wherein the substrate further comprises a matte surface associated with the second side between a portion of the surface and a portion of the second side for diffusing a surface acoustic wave transmitted by the Y-axis transmitting transducer.

20. The touch panel as claimed in claim 14, wherein the substrate comprises reflecting stripes arranged on the surface.

\* \* \* \* \*